US009735930B2

United States Patent
Khayrallah (10) Patent No.: US 9,735,930 B2
(45) Date of Patent: Aug. 15, 2017

(54) SYSTEM AND METHOD USING A SECONDARY NETWORK NODE FOR HANDLING PACKET RETRANSMISSIONS

(71) Applicant: Telefonaktiebolaget L M Ericsson (publ), Stockholm (SE)

(72) Inventor: Ali S. Khayrallah, Mountain View, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 317 days.

(21) Appl. No.: 14/268,483

(22) Filed: May 2, 2014

(65) Prior Publication Data

US 2015/0318962 A1   Nov. 5, 2015

(51) Int. Cl.
H04L 1/18 (2006.01)
H04L 1/00 (2006.01)
(Continued)

(52) U.S. Cl.
CPC .......... H04L 1/1893 (2013.01); H04L 1/0026 (2013.01); H04L 1/1887 (2013.01);
(Continued)

(58) Field of Classification Search
CPC .......... H04L 2001/0097; H04L 1/1887; H04L 2001/0093; H04L 5/0073; H04L 1/1819; H04L 1/0026; H04L 1/1893; H04L 47/12
See application file for complete search history.

(56) References Cited

U.S. PATENT DOCUMENTS

| 8,542,579 B2 * | 9/2013 | Rong | H04L 47/522 370/229 |
| 2006/0007862 A1 * | 1/2006 | Sayeedi | H04L 47/10 370/235 |

(Continued)

FOREIGN PATENT DOCUMENTS

EP   2 346 272 A1   7/2011

OTHER PUBLICATIONS

Luis Loyola et al., titled, "Increasing the Capacity of IEEE 802.11 Wireless LAN through Cooperative Coded Retransmissions", Vehicular Technology Conference, 2008. VTC Spring 2008. IEEE, Singapore, 2008, pp. 1746-1750, doi: 10.1109/VETECS.2008.400, (Loyola hereinafter) was published 2008.*

(Continued)

*Primary Examiner* — Andrew Lai
*Assistant Examiner* — Hoyet H Andrews
(74) *Attorney, Agent, or Firm* — Baker Botts, LLP (57) ABSTRACT

According to some embodiments, a method for handling packet retransmissions is implemented by a secondary network node and includes detecting a first data transmission from a first primary network node to a wireless device. A first response message from the first wireless device to the first primary network node is then detected. The response message indicates that the first data transmission included an error when received by the wireless device. A second data transmission from the secondary network node to the first wireless device is detected. The second data transmission from the secondary network node includes at least a portion of the first data transmission from the first primary network node.

17 Claims, 8 Drawing Sheets

(51) Int. Cl.
*H04L 5/00* (2006.01)
*H04L 12/801* (2013.01)

(52) U.S. Cl.
CPC ............ *H04L 47/12* (2013.01); *H04L 1/1819* (2013.01); *H04L 5/0073* (2013.01)

(56) References Cited

U.S. PATENT DOCUMENTS

| | | | | |
|---|---|---|---|---|
| 2009/0109892 | A1* | 4/2009 | Oyman | H04L 1/1887 370/315 |
| 2010/0017537 | A1* | 1/2010 | Linnartz | H04W 40/24 709/241 |
| 2010/0020739 | A1* | 1/2010 | Chou | H04W 40/246 370/315 |
| 2010/0056215 | A1* | 3/2010 | Gorokhov | H04B 7/024 455/561 |
| 2011/0124284 | A1* | 5/2011 | Adam | H04B 7/15592 455/7 |
| 2011/0296271 | A1* | 12/2011 | Tan | H04B 7/15592 714/752 |
| 2012/0176962 | A1* | 7/2012 | Kimura | H04B 7/155 370/315 |
| 2012/0315916 | A1* | 12/2012 | Van Phan | H04W 36/08 455/442 |
| 2013/0016600 | A1* | 1/2013 | Hwang | H04L 1/1883 370/216 |
| 2013/0064213 | A1* | 3/2013 | Park | H04W 76/023 370/329 |
| 2013/0077543 | A1* | 3/2013 | Kim | H04B 7/15507 370/281 |
| 2013/0107851 | A1* | 5/2013 | Park | H04B 7/026 370/329 |
| 2013/0235754 | A1* | 9/2013 | Lim | H04W 72/042 370/252 |
| 2013/0272174 | A1* | 10/2013 | Park | H04W 88/04 370/280 |
| 2013/0336227 | A1* | 12/2013 | Cho | H04W 48/16 370/328 |
| 2014/0010162 | A1* | 1/2014 | Cho | H04W 88/04 370/328 |
| 2014/0022982 | A1* | 1/2014 | Kim | H04L 1/0077 370/315 |
| 2015/0305041 | A1* | 10/2015 | Kim | H04W 72/085 370/329 |

OTHER PUBLICATIONS

Luis Loyola et al., titled, "Increasing the Capacity of IEEE 802.11 Wireless LAN through Cooperative Coded Retransmissions", Vehicular Technology Conference, 2008. VTC Spring 2008. IEEE, Singapore, 2008, pp. 1746-1750, doi: 10.1109/VETECS.2008.400.*
IEEE C802.16j-06/213 (Nov. 7, 2006), titled "An ARQ scheme for IEEE 802.16j multihop relay networks", (Kong hereinafter) was published Nov. 2006, pp. 00-05.*
IEEE C80216m-09/1718 (Aug. 29, 2009), titled "Proposed Text for CQI definition (15.3.9.3.1.3) for the IEEE 802.16m/D1", (Niu hereinafter) was published Aug. 29, 2009, pp. 01-05.*
PCT Notification of Transmittal of the International Search Report and the Written Opinion of the International Searching Authority, or the Declaration for International application No. PCT/IB2015/052949, Jul. 29, 2015.
IEEE C802.16j-06/213; Project: IEEE 802.16 Broad band Wireless Access Working Group; Title: An ARQ scheme for IEEE 802.16j multihop relay networks, Nov. 7, 2006.
"Increasing the capacity of IEEE 802.11 Wireless LAN through cooperative coded retransmissions" by Luis Loyola et al., 2008.
IEEE C802.16m-09/1718r2; Project: IEEE 802.16 Broadband Wireless Access Working Group; Title: Proposed Text for CQI definition 15.3.9.3.1.3) for the IEEE 802.16m/D1, Sep. 1, 2009.

* cited by examiner

SYSTEM AND METHOD USING A SECONDARY NETWORK NODE FOR HANDLING PACKET RETRANSMISSIONS

TECHNICAL FIELD

Particular embodiments relate generally to wireless communications and more particularly to a system and method that uses a secondary network node for handling packet retransmissions.

BACKGROUND

Wireless communication networks use some variant of Automatic Repeat ReQuest (ARQ), also known as Automatic Repeat Query, as an error-control method for data transmissions. The method relies upon packet retransmissions to achieve a desired quality of service.

Specifically, a network node may be configured to achieve desired error rates. For example, a network node may be set to transmit data packets at an error rate of 1%. As a result, packet transmissions will be expected to fail only 1% of the time. As another example, a network node may be set to transmit data packets at an error rate of 10%, and data packet transmissions will be expected to fail approximately 10% of the time. The network node may be configurable such that the modulation, coding, power, and bandwidth of data transmissions may be selected to achieve the desired error rate. When the user equipment or other wireless device receives an error-free packet, the wireless device transmits a positive acknowledgement message (ACK) to the transmitting network node that identifies the data frame or packet that was correctly received. Conversely, when the user equipment does not receive an error-free packet, the wireless device transmits a negative acknowledgement message (NAK) that identifies that the packet or frame was not properly received.

Upon receipt of a NAK message, the network node re-sends the first packet again. The receiving wireless device then processes the first and second transmissions together to boost its performance. If there still is a packet error after the first and second transmissions, the receiver sends a NAK again, and the network node re-sends the packet a third time. With each retransmission, the overall failure rate goes down. The ARQ process may be repeated as necessary but is typically terminated after a set number of re-transmissions. For example, the ARQ process may be terminated after two or three retransmissions. In the unlikely event that the packet is still in error, a higher level procedure may kick in to decide whether to reinitiate the transmission from the beginning or give up on the packet.

There are many variants to this basic idea. For instance, the second transmission may not be a repetition of the first packet. Instead, the second and subsequent transmissions may include complementary information, such as additional coded bits from encoding the same information. This type of scheme may be called a rateless code. It is considered rateless because the rate of the code is not known in advance and is instead determined by the successful reception of the packet. Additionally, the network node may continue transmitting packets representing the same information until it is told to stop by feedback from the receiver.

While the techniques described above may be used to achieve a desired quality of service in the wireless network, such techniques are not without drawbacks. Specifically, packet failures are unpredictable events. Accordingly, it is not possible to plan for their occurrence. Likewise, it is not possible to plan for the corresponding packet retransmissions after a failure is detected. This makes the handling of packets retransmissions difficult. Further, while a network node is in the process of retransmitting prior data transmission, any other data transmissions are put on hold. The resulting unpredictable delays also affect user experience.

SUMMARY

In particular example implementations, the proposed solutions may address the problems and user delays experienced as a result of the retransmissions of data packets.

According to some embodiments, a method for handling packet retransmissions is implemented by a secondary network node and includes detecting a first data transmission from a first primary network node to a wireless device. A first response message from the first wireless device to the first primary network node is then detected. The response message indicates that the first data transmission included an error when received by the wireless device. A second data transmission from the secondary network node to the first wireless device is detected. The second data transmission from the secondary network node includes at least a portion of the first data transmission from the first primary network node.

Some embodiments of the disclosure may provide one or more technical advantages. For example, certain embodiments provide a secondary network node in addition to a primary network node. The primary network node may rely on the secondary network node to perform the task of retransmitting data packets that included an error. As a result, the primary transmitter may focus on transmission of the next data packet in its queue. Thus, the secondary network node may eliminate the variable delay problem at the primary network node and enable the primary network node to handle packet retransmissions in a more predictable manner.

Still another technical advantage may be that the secondary network node may operate independently of the primary network node. Because the secondary network node eavesdrops on the transmissions from the primary network node, very little interaction may be required between the secondary network node and the primary network node.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Particular embodiments of the present disclosure may utilize on or more secondary radio network nodes to address the problems and user delays experienced as a result of the retransmissions of data packets by a serving network radio node. In a particular embodiment, a secondary network node includes the software and hardware necessary to handle packet retransmissions for one or more primary radio network nodes. Specifically, the secondary network node may eavesdrop on packet transmissions by a primary network node. When the secondary network node detects a data transmission from the primary network node to a wireless device, the secondary network node may then listen for a response message from the wireless device. If the secondary network node detects negative acknowledgement (NAK) from the wireless device that indicates that the data packet was not successfully received, the secondary radio network node may take over any retransmissions of the data packet. In this manner, the secondary network node may eliminate the variable delay problem at the primary network node and enable the primary network node to handle packet retransmissions in a more predictable manner. Because the radio network nodes operate independently of another, very little interaction may be required between the secondary network node and the primary network node.

Figure 1:
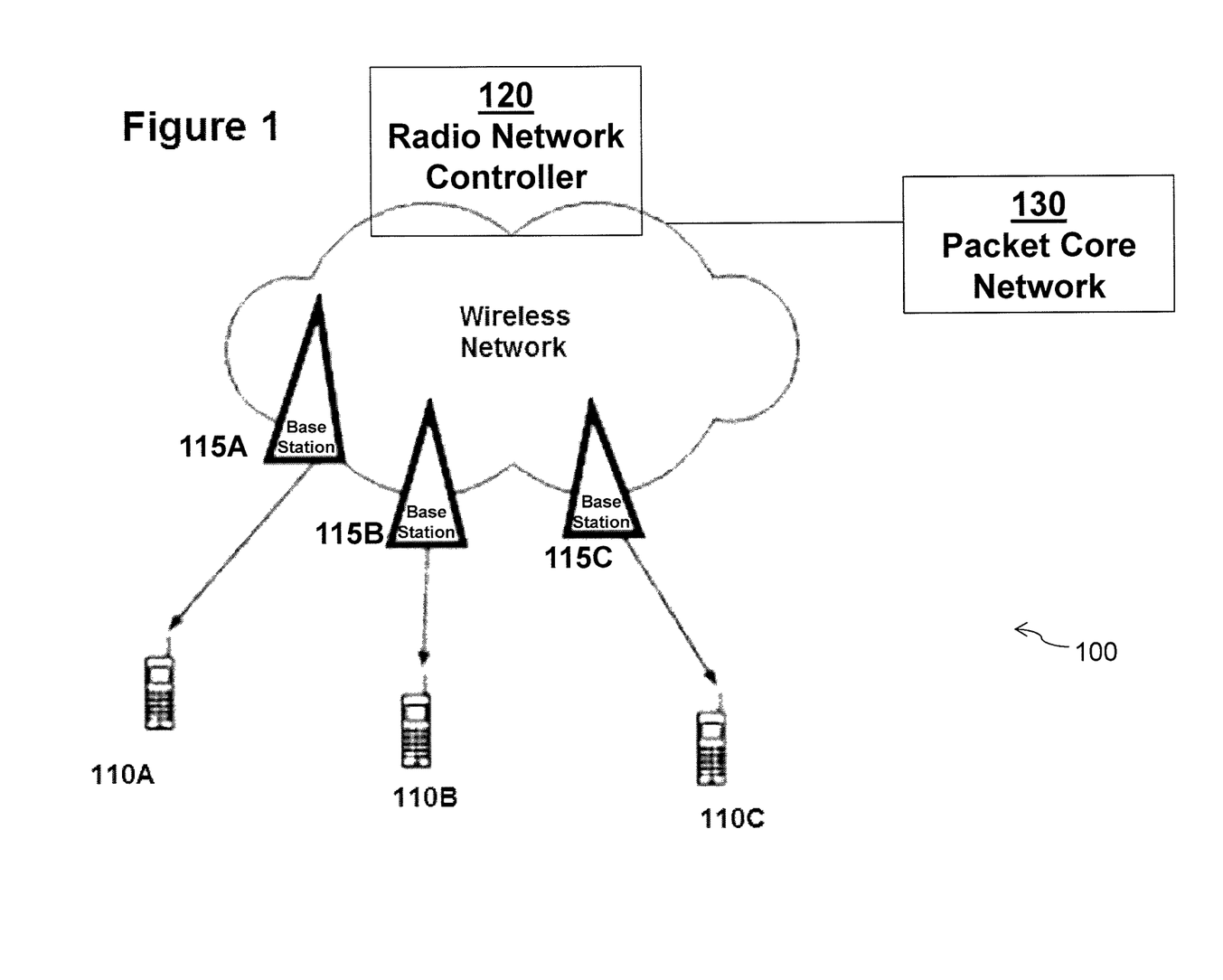
FIG. 1 is a block diagram illustrating an example embodiment of a network.

Particular embodiments are described in FIGS. 1-8 of the drawings, like numerals being used for like and corresponding parts of the various drawings. FIG. 1 is a block diagram illustrating an example of a network 100 that includes one or more wireless communication devices 110 and a plurality of network nodes. The network nodes include radio network nodes 115 and core network nodes 130. In the example, wireless communication device 110a communicates with radio network node 115a over a wireless interface. For example, wireless communication device 110a transmits wireless signals to radio network node 115a and/or receives wireless signals from radio network node 115a. The wireless signals contain voice traffic, data traffic, control signals, and/or any other suitable information.

A radio network node 115 refers to any suitable node of a radio access network/base station system. Examples include a radio access node (such as a base station or eNodeB) and a radio access controller (such as a base station controller or other node in the radio network that manages radio access nodes). Radio network node 115 interfaces (directly or indirectly) with core network node 130. For example, radio network node 115 interfaces with core network node 130 via an interconnecting network 125. Interconnecting network 125 refers to any interconnecting system capable of transmitting audio, video, signals, data, messages, or any combination of the preceding. Interconnecting network 125 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Core network node 130 manages the establishment of communication sessions and various other functionality for wireless communication device 110. Wireless communication device 110 exchanges certain signals with core network node 130 using the non-access stratum layer. In non-access stratum (NAS) signaling, signals between wireless communication device 110 and core network node 130 pass transparently through radio network nodes 115. Examples of wireless communication device 110, radio network node 115, and core network node 130 are described with respect to FIGS. 6, 7, and 8 respectively.

In general, a wireless device 110 is serviced by a particular radio network node 115 when the wireless device 110 is within a cell serviced by the radio network node 115. For example, wireless device 110A may be service by radio network node 115A when wireless device 110A is within the cell associated with radio network node 115A. However, it may be generally recognized that many wireless devices 110 may require service by radio network node 115A. For servicing the multiple devices, radio network node 115A may maintain a queue or "schedule" of data packet transmissions. However, the many wireless devices 110 served by a single radio network node 115A may be required to contend for common resources. As such the delay incurred in serving one packet to one wireless device 110 affects the waiting time of a packet intended for another wireless device 110. Stated differently, a wireless device 110 must wait for previous transmissions to other wireless devices 110 to complete before a scheduled transmission can be sent to the waiting wireless device 110.

Figure 2:
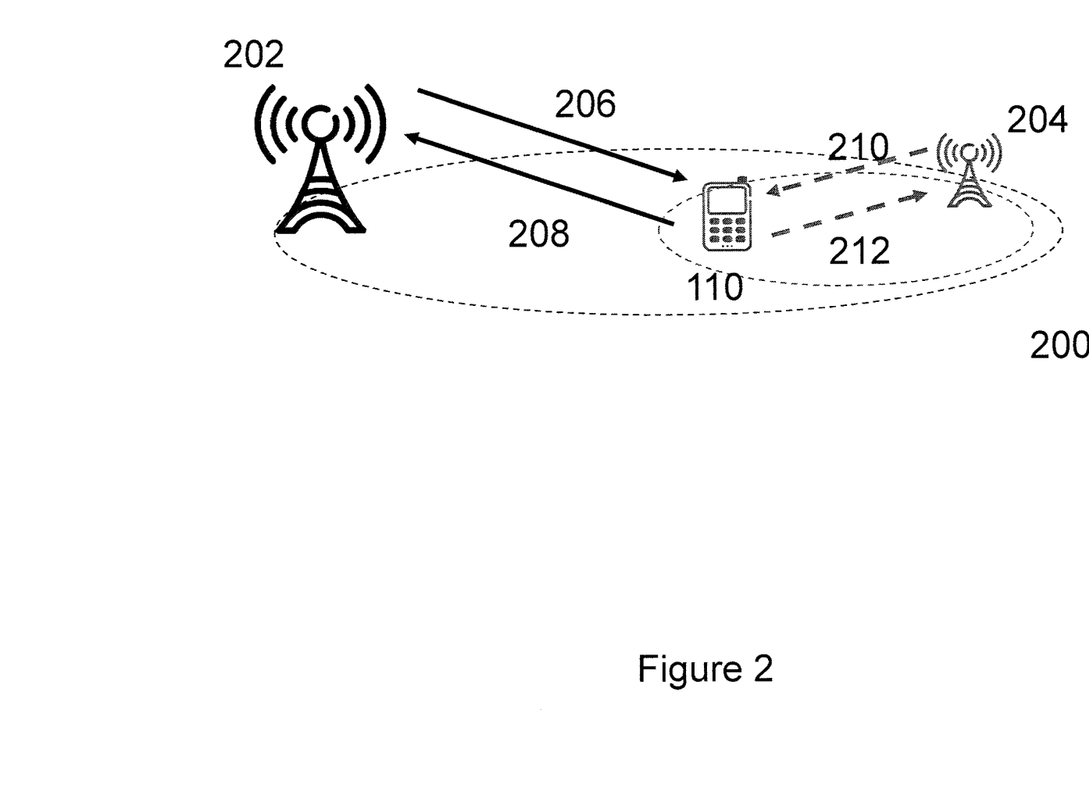
FIG. 2 is a block diagram illustrating an example network implementing both a primary network radio node and a secondary network radio node to reduce the delay resulting from data packet retransmissions.

FIG. 2 is a block diagram illustrating an example network 200 implementing both a primary network radio node 202 and a secondary network radio node 204 to reduce the delay resulting from data packet retransmissions. In certain embodiments, primary radio network node 202 may cover a larger area than secondary radio network node 204, and network 200 is a small cell in a heterogeneous network. However, it is generally recognized that this is only one example implementation. Network 200 may include any suitable network and primary and secondary radio network nodes 204 may cover any suitable range for servicing wireless devices 110 within network 200.

Primary radio network node 202 may be tasked with transmitting packets to wireless devices 110. For example, primary radio network node 202 may transmit a data packet or other block of information to wireless device 110A on forward channel 206. In a particular embodiment, primary radio network node 202 has knowledge about the channel state information (CSI) of the communication link between primary radio network node 202 and wireless device 110A. The CSI may be based on measurements performed by wireless device 110A and fed back to primary radio network node 202 on the reverse channel 208, as would be the case in FDD. In other embodiments, the CSI may be based on measurements made directly by primary radio network node 202, in the case of TDD. In either embodiment, primary radio network node 202 chooses the appropriate resources that are required to achieve a certain target error rate. For example, primary radio network node 202 may select the coding, modulation, and other suitable parameters and configurations needed to achieve a certain target error rate, such as 10%.

The data packet is then fed through a serial process. Typically, the serial process includes a parity check encoder, followed by an error correction encoder, followed by an interleaver, followed by a modulation mapper. When the data packet is received via forward channel 206, wireless device 110A may compute the parity check to know whether the packet made it successfully. Wireless device 110A then informs the primary radio network node 202 of the status of the received data packet. For example, if wireless device 110A determines via the parity check that the packet was received error-free, wireless device 110A may transmit a positive acknowledgement (AK) to primary radio network node 202. Conversely, if wireless device 110A determines that the packet included errors, wireless device 110A may transmit a negative acknowledgement (NAK) to primary radio network node 202. In certain embodiments, wireless device 110A may be configured only to send NAKs as needed. In such embodiments, primary radio network node 202 may assume that the transmission of the data packet was successful if a NAK is not received within a certain time window.

In certain embodiments, secondary radio network node 204 eavesdrops on the conversation between primary radio network node 202 and wireless device 110 on both the forward channel 206 and reverse channel 208. Secondary radio network node 204 can infer whether wireless device 110A is within range of secondary radio network node 204 by listening to the reverse channel 208 from wireless device 110A. Similar to primary radio network node 202, secondary radio network node 204 may require CSI from wireless device 110A, in certain embodiments. To obtain CSI about forward channel 210 from secondary network node 204 to wireless device 110A, secondary radio network node 204 may transmit a beacon. Wireless device 110A may measure the beacon and report CSI back to secondary radio network node 204 on reverse channel 212. This may be required in FDD. Though not required, the acquisition of CSI may be also be beneficial in TDD.

As stated above, secondary radio network node 204 eavesdrops on communications between primary radio network node 202 and wireless device 110A. For example, secondary radio network node 204 may receive, via forward channel 206, the first transmission from primary network node 202 intended for wireless device 110A. In a particular embodiment, secondary radio network node 204 may generally demonstrate better performance than wireless device 110A. For example, secondary radio network node 204 may be a better performer than wireless device 110A where secondary radio network node 204 is placed at a more advantageous location than wireless device 110A. As another example, secondary radio network node 204 may have a better receiver than a typical wireless device 110A. Specifically, secondary radio network node 204 may include more antennas and/or more powerful baseband processing than wireless device 110A. Where secondary radio network node 204 exhibits better performance than wireless device 110A, secondary radio network node 204 may have a much lower error rate than wireless device 110A. Thus, even where wireless device 110A receives an erroneous packet, secondary radio network node 204 may receive an error-free packet. As such, secondary radio network node 204 may be capable of decoding the information in the packet even where wireless device 110A is not.

In addition to detecting and decoding a data packet transmitted from primary network node 202 to wireless device 110A, secondary radio network node 204 may also detect the AK/NAK transmitted in response to the data packet. For example, secondary radio network node 204 may detect the transmission of an AK by wireless device 110A. In such an instance, secondary radio network node 204 will know that wireless device 110A does not need additional transmissions. However, where secondary radio network node 204 detects a NAK transmitted from wireless device 110A to primary radio network node 202, secondary radio network node 204 will recognize that wireless device needs retransmission of the data packet.

In particular embodiments, secondary radio network node 204 takes over the task of retransmitting the data packet. Accordingly, whereas primary radio network node 202 would normally be responsible for transmitting any retransmissions of the data packet, primary radio network node 202 may be relied of this duty such that the resources of primary radio network node can be used elsewhere. Specifically, because secondary radio network node 204 received the error-free data packet during the initial transmission from primary radio network node 202 to wireless device 110A, secondary radio network node 204 can form the additional data packet to be retransmitted to wireless device 110A. The data packet may be formed based on the CSI received about the forward link 210.

Secondary radio network node 204 may then listen for an AK or NAK from wireless device 110A to determine whether the retransmission of the data packet was successful. Where secondary radio network node 204 detects a second NAK, secondary radio network node 204 may form another additional data packet and attempt to retransmit the data packet again. This process may repeat a preconfigured number of times until it is determined that the process should be terminated.

While secondary radio network node 204 is handling the retransmissions of the data packets, primary radio network node 202 is freed up to deal with the next packet in the queue of primary radio network node 202. Because primary radio network node 202 can rely completely on secondary radio network node 204 to finish the task, primary radio network node 202 can act in a fire and forget mode. If secondary radio network node 204 fails for some reason, secondary radio network node 204 or wireless device 110A can send a NAK to primary radio network node 204. Primary radio network node 202 may then re-initiate the process of transmitting the data packet.

Consider two special cases. First, consider a scenario where wireless device 110A is out of range from secondary radio node 204. That is, secondary radio node 204 cannot hear wireless device 110A and/or cannot transmit reliably to wireless device 110A. In certain embodiments, the system may then revert back to basic operation, where the primary radio node 202 handles retransmissions of unsuccessful data packets. In a particular embodiment, for example, wireless device 110A informs primary radio node 202 that wireless device 110A is still waiting for help with the packet, or a number of packets. A higher level procedure may kick in to decide whether primary radio node 202 should send retransmissions, reinitiate the transmission from the beginning, or give up on the packet.

In another special case, secondary radio network node 204 may fail to detect the packet while eavesdropping on transmissions from primary radio network node 202, in spite of its higher reliability. Then secondary radio network node 204 cannot help wireless device 110A with that particular packet. Again, in certain embodiments, wireless device 110A informs primary radio network node 202 that wireless device 110A is still waiting for help with the packet, or a number of packets. A higher level procedure may kick in to decide whether primary radio network node 202 should send re-transmissions, reinitiate the transmission from the beginning or give up on the packet.

It is recognized that using CSI and aiming for a target error rate is a practical consideration. For instance, if primary radio network node 202 or secondary radio network node 204 aim for a 10% packet error rate, then the transmitting node is reasonably confident that data packet will be successfully received after one or two retransmissions of the data packet. However, it is possible to operate primary radio network node 202 and/or secondary radio network node 204 without the benefit of CSI. Accordingly, in particular embodiments, network 200 may be operated using a rateless coding scheme without CSI knowledge, or with only a very rough knowledge of the quality of the communication links. For example, only the average signal-to-noise ratio of a wireless device 110A or an average signal-to-noise ratio in the cell may be known. The target error rate may be set accordingly.

Consider, a scenario where network 200 does not include secondary radio network node 204. Where CSI is not known by primary radio network node 202, the initial transmission of the data packet might be mismatched to the actual channel state. If the actual channel state is much better than the target, then transmission of the data packet is successful and primary radio network node 202 moves on to the next data packet in the queue. However, if the actual channel state is much worse than the target, then transmission of the data packet may likely fail and many additional transmissions may be required before the transmission is deemed successful. The advantage of operating without CSI is that the feedback requirements are relaxed, in terms of response time, frequency, and data rate. In the extreme case, there is no CSI feedback required.

Now consider the scenario where, as depicted, network 200 includes the secondary radio network node 204. Primary radio network node 202 may operate without CSI in a manner like that above. Thus, the CSI feedback requirement from wireless device 110A to primary radio network node 202 may be relaxed or removed entirely. After the initial transmission to wireless device 110, primary radio network node 202 is no longer responsible for the packet since secondary radio network node 204 will handle any subsequent retransmissions. If secondary radio network node 204 also operates without CSI, then the CSI feedback requirement from wireless device 110A to secondary radio network node 204 may also be relaxed or removed. Secondary radio network node 204 may send additional retransmissions of the data packet until the data packet is successfully received by wireless device 110A or until the process times out and terminates.

It may be recognized that the operation with or without CSI can be done independently in primary radio network node 202 and secondary radio network node. For instance, P may operate normally, with the benefit of CSI feedback, whereas S may operate without feedback. This can be attractive if S is a very simplified base station with very low power. Since U has to be close to S in order to be served by it, there may not be a big advantage to fine tuning the transmissions from S to the channel state of U. Also, a larger number of transmissions from S to U may be tolerable than if they were coming from P, since the resulting delay does not affect many other users.

Particular embodiments described above assume that secondary radio network node 204 is a small cell having lower transmit power. In certain embodiments, secondary radio network node 204 may have fewer antennas than primary radio network node 202. Additionally, or alternatively, secondary radio network node 204 may also be positioned closer to the ground than primary radio network node 202. In general, a wireless device 110 within range of the secondary radio network node 204 may be assumed to be close to it, and usually closer to it than to primary radio network node.

On the downlink 210, the stronger signals from primary radio network node 202 may overwhelm those from secondary radio network node 204. Thus, it may be desirable to separate the signals from primary radio network node 202 from the signals from secondary radio network node 204, in certain embodiments. For example, the signals may be separated in frequency, time, code, or some combination thereof. Other approaches may include adopting solutions developed in the context of heterogeneous network. This includes approaches such as almost blank subframe, or reduced power subframe. Even though signal separation may require primary radio network node 202 to give up some of its resources to secondary radio network node 204, system 200 provides the technical advantage of freeing up primary radio network node 202 for the handling of other packets.

In particular embodiments, wireless device 110 may be capable of interference cancellation. In such a scenario, wireless device 110 may receive and remove the dominant signal from primary radio network node 202 with high reliability. Interference cancellation allows wireless device 110 to uncover the weaker signal from secondary radio network node 204. In such a scenario signal separation may not be necessary. In still other embodiments, time alignment between the transmission from secondary radio network node 204 and primary radio network node 202 would simplify the task of the receiver of wireless device 110.

In still other embodiments, the proximity of wireless device 110 to secondary radio network 204 may make it possible to avoid signal separation on the uplink. However, some wireless devices 110 connected to primary radio network node 202 but not secondary radio network node 204 may be transmitting at peak power to overcome distance. Transmissions from such devices may overwhelm those intended for secondary radio network node 204. If secondary radio network node 204 has a receiver capable of interference cancellation, then as before, signal separation may not be needed. However, if secondary radio network node 204 does not have interference cancellation, then signal separation may be desired for the downlink.

As described above, secondary radio network node 204 operates as a downlink complement to the primary radio network node 202. In certain embodiments, secondary radio network node 204 is connected to the network. However, it is not necessary that secondary radio network node 204 be connected to the network to boost performance of primary radio network node 202. Rather, secondary radio network node 204 obtains a data packet by eavesdropping on the downlink of primary radio network node 202. If secondary radio network node 204 fails to deliver the packet to wireless device 110, either one of secondary radio network node 204 or wireless device 110 S may inform primary radio network node 202 of the failure. Even to the extent that it is advantageous to connect secondary radio network node 204 to the network for other purposes, such as network management, such a connection might be needed only occasionally As such, the connection between secondary radio network node 204 and the network may require much lower bandwidth than the connection between primary radio network node 202 and the network.

Figure 3:
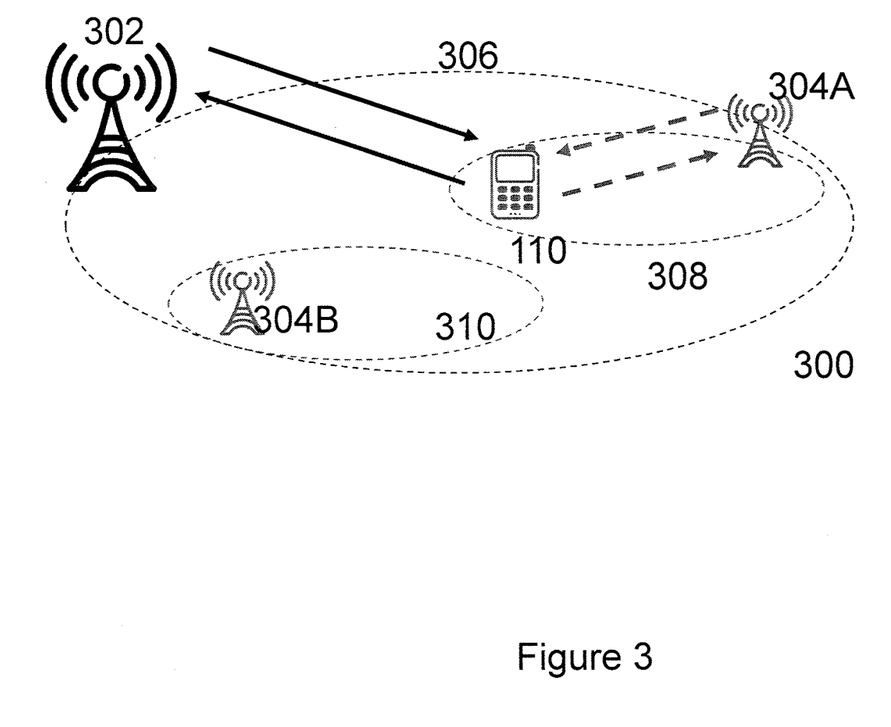
FIG. 3 is a block diagram illustrating an example network utilizing multiple secondary radio network nodes to reduce the delay resulting from data packet retransmissions.

FIG. 3 is a block diagram illustrating an example network 300 utilizing multiple secondary radio network nodes 304 to reduce the delay resulting from data packet retransmissions. As depicted network 300 includes two secondary radio network nodes 304A-B. It is recognized, however, that network 300 may include any appropriate number of secondary radio network nodes 304.

In particular embodiments, both of secondary radio network node 304A and 304B are within range of primary radio network node 302. Thus, secondary radio network nodes 304A and 304B are both within the cell 306 of primary radio network node 302. However, the cell 308 within which secondary radio network node 304A transmits does not overlap the cell 310 within which secondary radio network node 304B transmits. As such, as it moves through cell 306, wireless device 110 is within range of one of secondary radio network nodes 304A and 304B but is never within range of both. If wireless device 110 is being serviced by secondary radio network node 304A, secondary radio network node 304B may be idle and silent or available to service other wireless devices 110 within cell 310. In this manner, secondary radio network nodes 304A and 304B may operate independently of one another, in certain embodiments.

Figure 4:
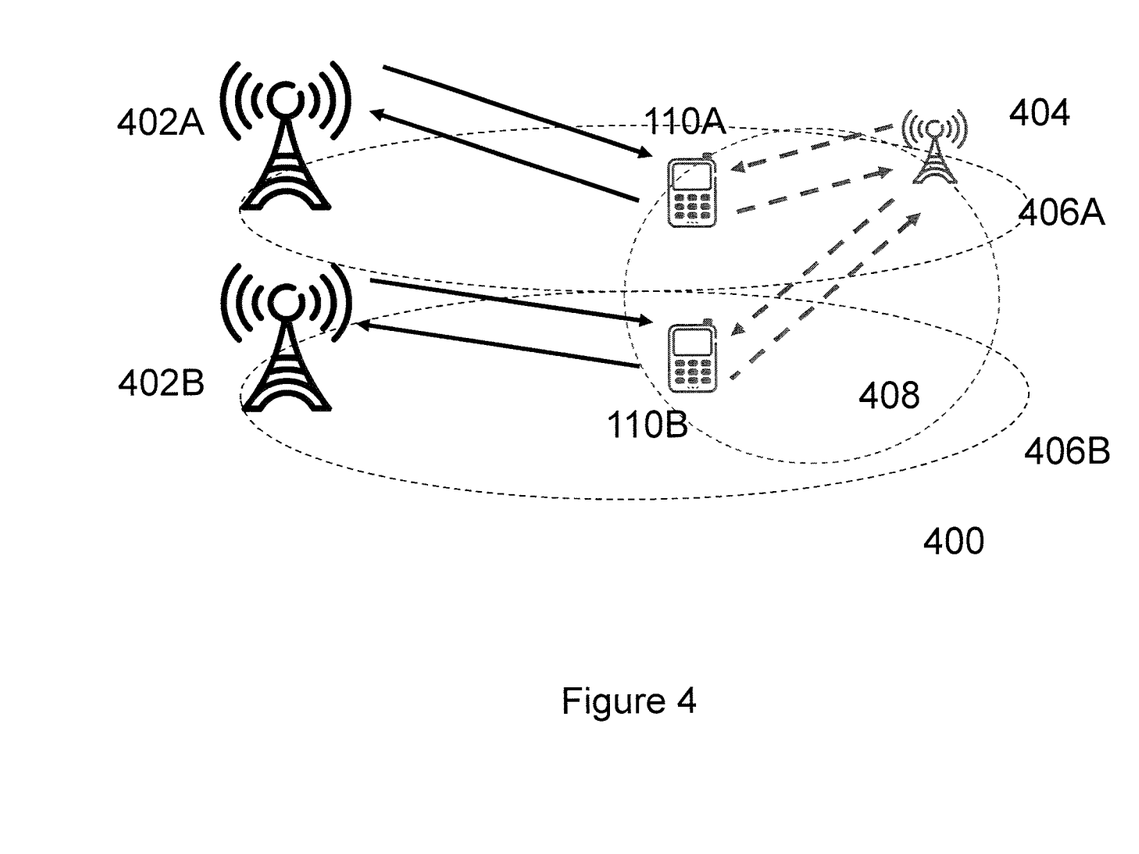
FIG. 4 is a block diagram illustrating an example network utilizing a secondary radio network node 404 to assist multiple primary radio network nodes in data packet retransmissions.

FIG. 4 is a block diagram illustrating an example network 400 utilizing a secondary radio network node 404 to assist multiple primary radio network nodes 402 in data packet retransmissions. As depicted, network 400 includes two primary radio network nodes 402A-B and one secondary radio network node 404. It is recognized, however, that network 400 may include any appropriate number of primary radio network nodes 402 being assisted by any appropriate number of secondary radio network nodes 404.

Primary radio network node 402A serves wireless devices 110, such as 110A, that are within primary cell 406A. Likewise, primary radio network node 402B serves wireless devices 110, such as 110B, that are within primary cell 406B. In the illustrated embodiment, the position of secondary radio network node 404 allows secondary radio network node 404 to assist both primary radio network nodes 402A and 402B. Thus, secondary cell 408 overlaps both primary cells 406A and 406B. Secondary cell 408 may eavesdrop on communications sent by both of primary cells 406A and 406B and, when warranted, handle retransmissions to wireless devices 110A and 110B, respectively.

In the illustrated embodiment, the position of secondary radio network node 404 at the edge of the primary cell 406 provides assistance to the most disadvantaged wireless devices 110 within primary cell 406. Specifically, wireless devices 110 that are located near the border of first primary cell 406 may be the most disadvantaged wireless devices 110 within first primary cell 406. As a result, these disadvantaged wireless devices 110 may occupy a disproportionate portion of resources of primary radio network node 402A. However, utilizing secondary radio network node 404 placed at the edge of primary cell 406 to perform the operations of retransmissions allows the resources of primary radio network node 402A to be utilized elsewhere.

Because secondary cell 408 also overlaps primary network cell 406B, secondary radio network node 404 may provide similar services to boost performance of primary radio network node 402B. As depicted, wireless device 110B, which is served by primary radio network node 402B, may also be served by secondary radio network node 404. In operation, when secondary radio network node 404 serves two or more primary radio network nodes 402A-B, transmissions to wireless devices 110A and 110B may be multiplexed on the downlink from secondary radio network node 404 using separate resource units. Similarly, feedback from wireless devices 110A and 110B to secondary radio network node 404 may be multiplexed using separate resource units.

The positioning of secondary radio network node 404 at the edge between two or more primary cells may provide additional advantages. For example, to the extent that wireless device 110A is within range of secondary radio network node 404, it is irrelevant whether secondary radio network node 404 belongs to primary network node 402A or 402B. Secondary radio network node 404 may independently handle transmissions to wireless devices 110A and 110B.

Figure 5:
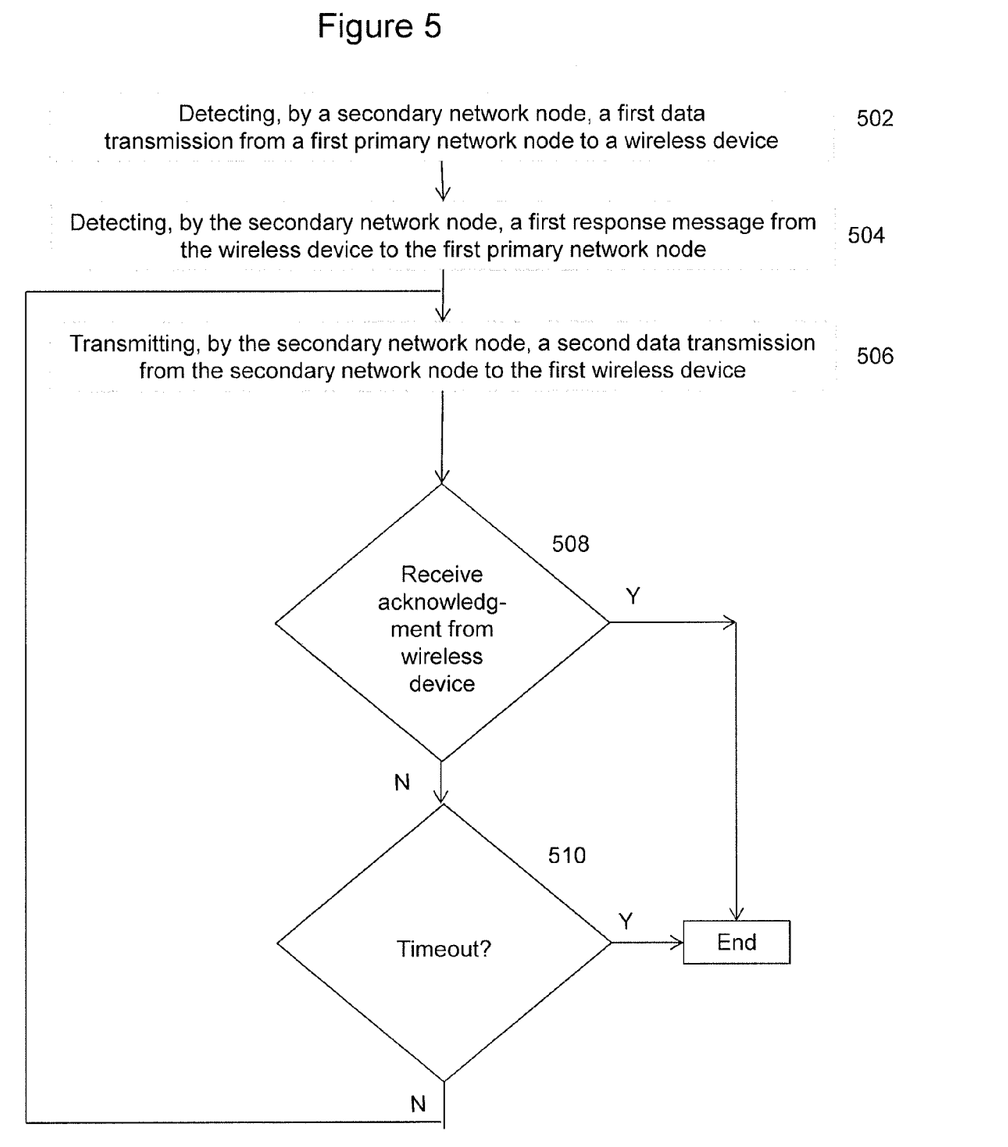
FIG. 5 is a flowchart illustrating an example embodiment of a method using a secondary network node for handling packet retransmissions.

FIG. 5 is a flowchart illustrating an example embodiment of a method using a secondary network node for handling packet retransmissions. The method begins at step 502 when a secondary network node 204 detects a first data transmission from a first primary network node 202 to wireless device 110. In particular embodiments, secondary network node 204 eavesdrops on transmissions from primary network node 202.

At step 504, the secondary network node 204 may detect a first response message sent from wireless device 110A to primary radio network node 202. For example, where the initial transmission from primary radio network 202 fails, secondary network node 204 may detect a NAK message sent from wireless device 110A to primary radio network node 202. Secondary radio network node 204 may then take over the retransmissions of the initial data packet to allow primary radio network node to focus its transmission resources on the transmission of other data packets. In a particular embodiment, secondary radio network node 204 transmits a second data transmission from the secondary radio network node 204 to wireless device 110A. In particular embodiments, the second data transmission may include be a retransmission of the first data packet. In other embodiments, the second data transmission may include a retransmission of a portion of the first data packet. Additional or alternatively, the second data transmission may include additional or different coding for the first data packet.

At step 506, secondary radio network node 204 determines whether acknowledgement has been received from wireless device 110A. The acknowledgement may indicate that the second data packet was received successfully. If acknowledgement is received, the method concludes. However, if no acknowledgement is received, secondary radio network node 204 may determine whether the transmission has timed out. In particular embodiments, the transmission may time out after secondary radio network node 204 transmits the second packet n times. In other embodiments, the transmission may time out after a predetermined amount of time lapses. If the transmission has, timed out, the method terminates. However, if the transmission has not timed out, the method returns to step 506, and secondary network node 204 retransmits the data packet. In this manner, the method may cycle through steps 506-510, until the data packet is successfully received or the transmission times out.

As described with respect to FIG. 1 above, embodiments of network 100 may include one or more wireless communication devices 110, and one or more different types of network nodes capable of communicating (directly or indirectly) with wireless communication devices 110. Examples of the network nodes include radio network nodes 120 and core network nodes 130. The network may also include any additional elements suitable to support communication between wireless communication devices 110 or between a wireless communication device 110 and another communication device (such as a landline telephone).

Wireless communication device 110, radio network node 120, and core network node 130 use any suitable radio access technology, such as long term evolution (LTE), LTE-Advanced, UMTS, HSPA, GSM, cdma2000, WiMax, WiFi, another suitable radio access technology, or any suitable combination of one or more radio access technologies. For purposes of example, various embodiments may be described within the context of certain radio access technologies. However, the scope of the disclosure is not limited to the examples and other embodiments could use different radio access technologies. Each of wireless communication device 110, radio network node 115, radio network controller 120, and core network node 130 include any suitable combination of hardware and/or software. Examples of particular embodiments of wireless communication device 110, radio network node 120, and core network node 130 are described with respect to FIGS. 6, 7, and 8 below, respectively.

Figure 6:
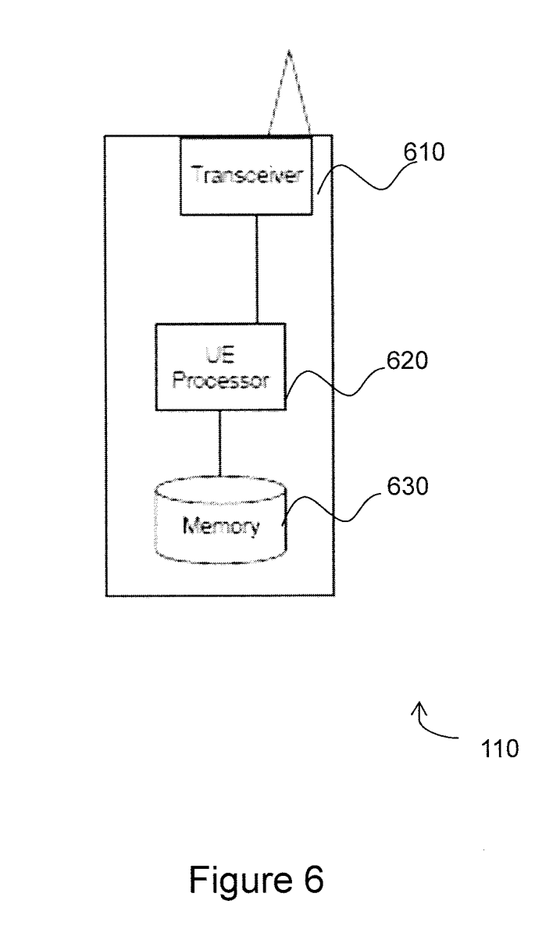
FIG. 6 is a block diagram illustrating embodiments of a wireless device.

FIG. 6 is a block diagram illustrating an example of wireless communication device 110. Examples of wireless communication device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or another device that can provide wireless communication. A wireless communication device 110 may also be referred to as user equipment (UE), a station (STA), a mobile station (MS), a device, a wireless device, or a terminal in some embodiments. Wireless communication device 110 includes transceiver 610, processor 620, and memory 630. In some embodiments, transceiver 610 facilitates transmitting wireless signals to and receiving wireless signals from radio network node 115 (e.g., via an antenna), processor 620 executes instructions to provide some or all of the functionality described above as being provided by wireless communication device 110, and memory 630 stores the instructions executed by processor 620.

Processor 620 includes any suitable combination of hardware and software implemented in one or more modules to execute instructions and manipulate data to perform some or all of the described functions of wireless communication device 110. In some embodiments, processor 620 includes, for example, one or more computers, one or more central processing units (CPUs), one or more microprocessors, one or more applications, and/or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless communication device 110 include additional components (beyond those shown in FIG. 6) responsible for providing certain aspects of the wireless communication device's functionality, including any of the functionality described above and/or any additional functionality (including any functionality necessary to support the solution described above).

Figure 7:
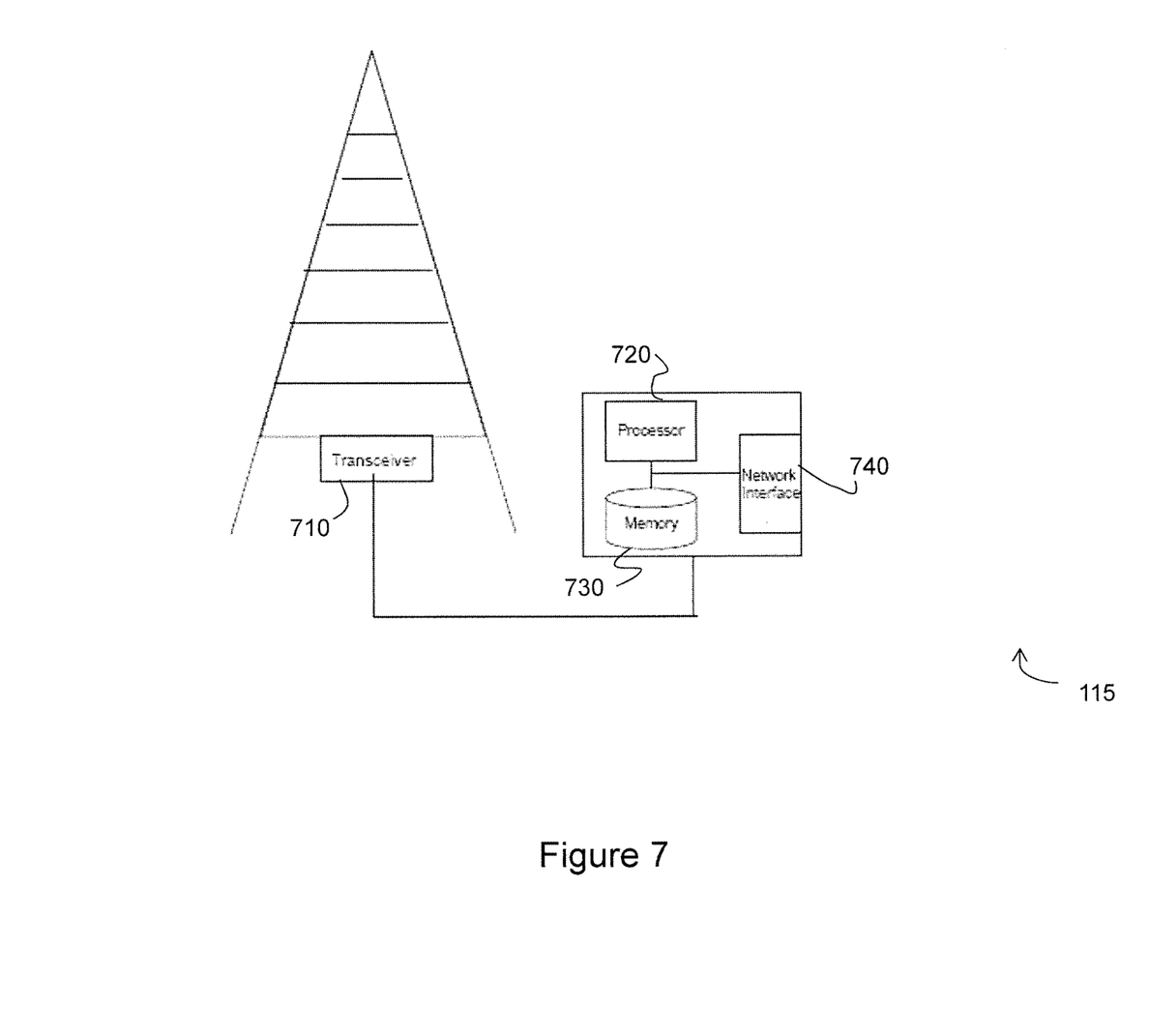
FIG. 7 is a block diagram illustrating embodiments of a radio access node.

FIG. 7 is a block diagram illustrating embodiments of radio network node 115. In the illustration, radio network node 115 is shown as a radio access node, such as an eNodeB, a node B, a base station, a wireless access point (e.g., a Wi-Fi access point), a low power node, a base transceiver station (BTS), transmission points, transmission nodes, remote RF unit (RRU), remote radio head (RRH), etc. Other radio network nodes 115, such as one or more radio network controllers, may be configured between the radio access nodes 120 and core network nodes 130. These other radio network nodes 115 may include processors, memory, and interfaces similar to those described with respect to FIG. 7, however, these other radio network nodes might not necessarily include a wireless interface, such as transceiver 710.

Radio access nodes are deployed throughout network 100 as a homogenous deployment, heterogeneous deployment, or mixed deployment. A homogenous deployment generally describes a deployment made up of the same (or similar) type of radio access nodes and/or similar coverage and cell sizes and inter-site distances. A heterogeneous deployment generally describes deployments using a variety of types of radio access nodes having different cell sizes, transmit powers, capacities, and inter-site distances. For example, a heterogeneous deployment may include a plurality of low-power nodes placed throughout a macro-cell layout. Mixed deployments include a mix of homogenous portions and heterogeneous portions.

Radio network node 115 includes one or more of transceiver 710, processor 720, memory 730, and network interface 740. Transceiver 710 facilitates transmitting wireless signals to and receiving wireless signals from wireless communication device 110 (e.g., via an antenna), processor 720 executes instructions to provide some or all of the functionality described above as being provided by a radio network node 115, memory 730 stores the instructions executed by processor 720, and network interface 740 communicates signals to backend network components, such as a gateway, switch, router, Internet, Public Switched Telephone Network (PSTN), other radio network nodes 115, core network nodes 130, etc.

Processor 720 includes any suitable combination of hardware and software implemented in one or more modules to execute instructions and manipulate data to perform some or all of the described functions of radio network node 115. In some embodiments, processor 720 includes, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 740 is communicatively coupled to processor 720 and refers to any suitable device operable to receive input for radio network node 115, send output from radio network node 115, perform suitable processing of the input or output or both, communicate to other devices, or any combination of the preceding. Network interface 740 includes appropriate hardware (e.g., port, modem, network interface card, etc.) and software, including protocol conversion and data processing capabilities, to communicate through a network.

Other embodiments of radio network node 115 include additional components (beyond those shown in FIG. 7) responsible for providing certain aspects of the radio network node's functionality, including any of the functionality described above and/or any additional functionality (including any functionality necessary to support the solution described above). The various different types of radio access nodes may include components having the same physical hardware but configured (e.g., via programming) to support different radio access technologies, or may represent partly or entirely different physical components.

Figure 8:
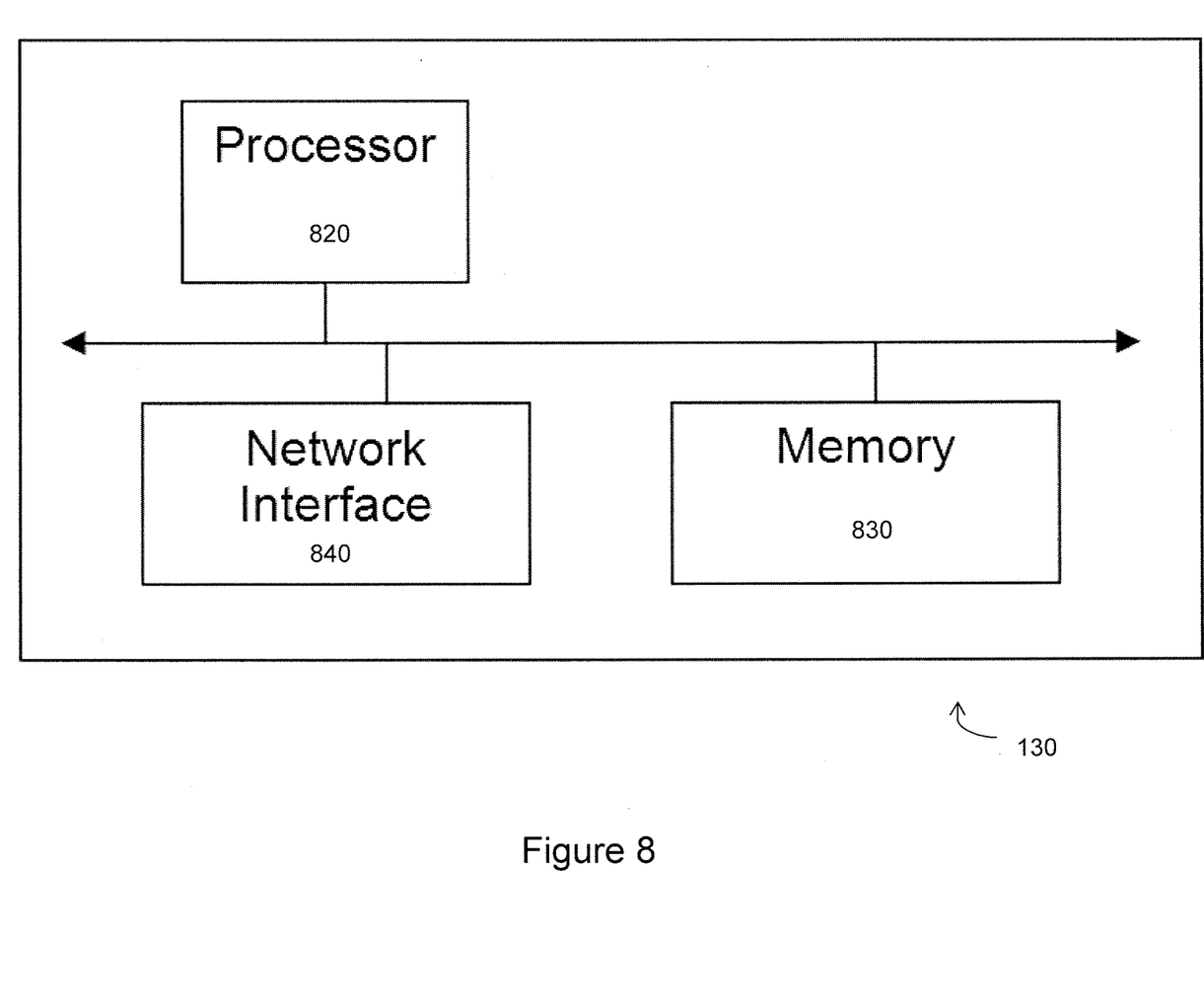
FIG. 8 is a block diagram illustrating embodiments of a core network node.

FIG. 8 is a block diagram illustrating a core network node 130. Examples of core network node 130 can include a mobile switching center (MSC), a serving GPRS support node (SGSN), a mobility management entity (MME), a radio network controller (RNC), a base station controller (BSC), and so on. Core network node 130 includes processor 820, memory 830, and network interface 840. In some embodiments, processor 820 executes instructions to provide some or all of the functionality described above as being provided by core network node 130, memory 830 stores the instructions executed by processor 820, and network interface 840 communicates signals to an suitable node, such as a gateway, switch, router, Internet, Public Switched Telephone Network (PSTN), radio network nodes 115, other core network nodes 130, etc.

Processor 820 includes any suitable combination of hardware and software implemented in one or more modules to execute instructions and manipulate data to perform some or all of the described functions of core network node 130. In some embodiments, processor 820 includes, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for core network node 130, send output from core network node 130, perform suitable processing of the input or output or both, communicate to other devices, or any combination of the preceding. Network interface 840 includes appropriate hardware (e.g., port, modem, network interface card, etc.) and software, including protocol conversion and data processing capabilities, to communicate through a network.

Other embodiments of core network node 130 include additional components (beyond those shown in FIG. 8) responsible for providing certain aspects of the core network node's functionality, including any of the functionality described above and/or any additional functionality (including any functionality necessary to support the solution described above).

Some embodiments of the disclosure may provide one or more technical advantages. For example, certain embodiments provide a secondary network node in addition to a primary network node. The primary network node may rely on the secondary network node to perform the task of retransmitting data packets that included an error. As a result, the primary transmitter may focus on transmission of the next data packet in its queue. Thus, the secondary network node may eliminate the variable delay problem at the primary network node and enable the primary network node to handle packet retransmissions in a more predictable manner.

Still another technical advantage may be that the secondary network node may operate independently of the primary network node. Because the secondary network node eavesdrops on the transmissions from the primary network node, very little interaction may be required between the secondary network node and the primary network node.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A secondary network node for handling packet retransmissions, comprising:
   one or more processors; and
   a non-transitory computer-readable storage medium further including computer-readable instructions that, when executed by the one or more processors, are configured to:
      detect a first data transmission from a first primary network node to a first wireless device, the first data transmission comprising a data packet representing an information block, the first wireless device comprising a user equipment;
      detect, by the secondary network node, a first response message from the first wireless device to the first primary network node, the response message indicating that the first data transmission included an error when received by the wireless device; and
      in response to detecting by the secondary network node the first response message from the wireless device indicating that the first data transmission included the error when received by the wireless device, transmitting a second data transmission from the secondary network node to the first wireless device, the second data transmission comprising a retransmission of the first data transmission from the primary network node that was received with the error by the wireless device.

2. The secondary network node of claim 1, wherein the instructions are further configured, when executed, to:
prior to transmitting the second data transmission from the secondary network node to the first wireless device, obtain channel state information from the first wireless device;
based on the channel state information, choose one or more transmission resources in order to achieve a target error rate for the transmission the second data transmission.

3. The secondary network node of claim 1, wherein the instructions are configured to:
without knowledge of channel state information relating to the channel between the secondary network node and the first wireless device, set a target error rate for the second data transmission from the secondary network node, the target error rate being based on an assumed state of the channel;
receive a second response message from the first wireless device, the second response message indicating that the second data transmission included an error when received by the first wireless device;
adjust the target error rate for transmission of a third data transmission from the secondary network node to the first wireless device; and
transmit the third data transmission from the secondary network node to the first wireless device, the third data transmission comprising at least a portion of the first data transmission and being transmitted at the adjusted target error rate.

4. The secondary network node of claim 1, wherein the instructions are further configured, when executed, to:
receive a second response message from the wireless device, the second response message indicating that the second data transmission included an error when received by the first wireless device;
transmitting a third data transmission from the secondary network node to the first wireless device, the third data transmission comprising at least a portion of the first data transmission from the first primary network node.

5. The secondary network node of claim 1, wherein the second data transmission is separated from the first data transmission by at least one of frequency, time, and code.

6. The secondary network node of claim 1, wherein the instructions are further configured, when executed, to:
detect a third data transmission from a second primary network node to a second wireless device;
detect a second response message from the second wireless device to the second primary node network node, the second response message indicating that the third data transmission included an error when received by the wireless device; and
transmit a fourth data transmission from the secondary network node to the second wireless device, the fourth data transmission comprising at least a portion of the third data transmission.

7. A method for handling packet retransmissions, comprising:
detecting, by a secondary node, a first data transmission from a first primary network node to a first wireless device, the first wireless device comprising a user equipment;
detecting, by the secondary node, a first response message from the first wireless device to the first primary network node, the response message indicating that the first data transmission included an error when received by the wireless device; and
in response to detecting by the secondary node the first response message from the wireless device indicating that the first data transmission included the error when received by the wireless device, transmitting, by the secondary node, a second data transmission from the secondary network node to the first wireless device, the second data transmission comprising a retransmission of the first data transmission from the primary network node that was received with the error by the wireless device.

8. The method of claim 7, further comprising:
prior to transmitting the second data transmission from the secondary network node to the first wireless device, obtaining channel state information from the first wireless device;
based on the channel state information, choosing one or more transmission resources in order to achieve a target error rate for the transmission the second data transmission.

9. The method of claim 7, further comprising:
without knowledge of channel state information relating to the channel between the secondary network node and the first wireless device, setting a target error rate for the second data transmission from the secondary network node, the target error rate being based on an assumed state of the channel;
receiving a second response message from the first wireless device, the second response message indicating that the second data transmission included an error when received by the first wireless device;
adjust the target error rate for transmission of a third data transmission from the secondary network node to the first wireless device; and
transmit the third data transmission from the secondary network node to the first wireless device, the third data transmission comprising at least a portion of the first data transmission and being transmitted at the adjusted target error rate.

10. The method of claim 7, further comprising:
receiving a second response message from the wireless device, the second response message indicating that the second data transmission included an error when received by the first wireless device;
transmitting a third data transmission from the secondary network node to the first wireless device, the third data transmission comprising at least a portion of the first data transmission from the first primary network node.

11. The method of claim 7, wherein the second data transmission is separated from the first data transmission by at least one of frequency, time, and code.

12. The method of claim 7, further comprising:
detecting a third data transmission from a second primary network node to a second wireless device;
detecting a second response message from the second wireless device to the second primary node network node, the second response message indicating that the third data transmission included an error when received by the wireless device; and transmitting a fourth data transmission from the secondary network node to the second wireless device, the fourth data transmission comprising at least a portion of the third data transmission.

13. A non-transitory computer-readable storage medium, having stored there on a computer program that, when executed on one or more processors, causes the one or more processors to:
  detect, by a secondary network node, a first data transmission from a first primary network node to a first wireless device, the first wireless device comprising a user equipment;
  detect, by the secondary network node, a first response message from the first wireless device to the first primary network node, the response message indicating that the first data transmission included an error when received by the wireless device; and
  in response to detecting by the secondary network node the first response message from the wireless device indicating that the first data transmission included the error when received by the wireless device, transmit, by the secondary network node, a second data transmission from the secondary network node to the first wireless device, the second data transmission comprising a retransmission of the first data transmission from the primary network node that was received with the error by the wireless device.

14. The medium of claim 13, wherein, when executed, the computer program causes the one or more processors to:
  prior to transmitting the second data transmission from the secondary network node to the first wireless device, obtain channel state information from the first wireless device;
  based on the channel state information, choose one or more transmission resources in order to achieve a target error rate for the transmission the second data transmission.

15. The medium of claim 13, wherein, when executed, the computer program causes the one or more processors to:
  without knowledge of channel state information relating to the channel between the secondary network node and the first wireless device, set a target error rate for the second data transmission from the secondary network node, the target error rate being based on an assumed state of the channel;
  receive a second response message from the first wireless device, the second response message indicating that the second data transmission included an error when received by the first wireless device;
  adjust the target error rate for transmission of a third data transmission from the secondary network node to the first wireless device; and
  transmit the third data transmission from the secondary network node to the first wireless device, the third data transmission comprising at least a portion of the first data transmission and being transmitted at the adjusted target error rate.

16. The medium of claim 13, wherein, when executed, the computer program causes the one or more processors to:
  receive a second response message from the wireless device, the second response message indicating that the second data transmission included an error when received by the first wireless device;
  transmitting a third data transmission from the secondary network node to the first wireless device, the third data transmission comprising at least a portion of the first data transmission from the first primary network node.

17. The medium of claim 13, wherein the second data transmission is separated from the first data transmission by at least one of frequency, time, and code.

* * * * *